United States Patent
Fujimori (10) Patent No.: US 12,445,902 B2
(45) Date of Patent: Oct. 14, 2025

(54) COMMUNICATION DEVICE, COMMUNICATION METHOD THEREOF, INFORMATION PROCESSING DEVICE, CONTROL METHOD THEREOF, AND COMPUTER-READABLE STORAGE MEDIUM

(71) Applicant: CANON KABUSHIKI KAISHA, Tokyo (JP)

(72) Inventor: Yuki Fujimori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 551 days.

(21) Appl. No.: 17/395,498

(22) Filed: Aug. 6, 2021

(65) Prior Publication Data
US 2021/0368391 A1 Nov. 25, 2021

Related U.S. Application Data

(63) Continuation of application No. PCT/JP2020/004258, filed on Feb. 5, 2020.

(30) Foreign Application Priority Data

Feb. 28, 2019 (JP) ................. 2019-036402

(51) Int. Cl.
H04W 28/06 (2009.01)
H04W 28/16 (2009.01)
H04W 76/15 (2018.01)

(52) U.S. Cl.
CPC ........... *H04W 28/06* (2013.01); *H04W 28/16* (2013.01); *H04W 76/15* (2018.02)

(58) Field of Classification Search
CPC ..... H04W 84/12; H04W 72/04; H04W 76/15; H04W 72/23; H04W 72/27; H04W 28/06;
(Continued)

(56) References Cited

U.S. PATENT DOCUMENTS 8,472,383 B1 * 6/2013 Banerjea ........... H04W 72/0473
370/328
2011/0002219 A1 1/2011 Kim et al.
(Continued)

FOREIGN PATENT DOCUMENTS

| CN | 103563457 A | 2/2014 |
| CN | 104219017 A | 12/2014 |

(Continued)

OTHER PUBLICATIONS

Extended European Search Report issued in corresponding EP Patent Application No. 20762492.5, dated Dec. 7, 2022, pp. 1-7.
(Continued)

*Primary Examiner* — Golam Sorowar
(74) *Attorney, Agent, or Firm* — Carter, DeLuca & Farrell LLP (57) ABSTRACT

A communication device communicates a radio frame including a preamble and a data field of a physical layer (PHY). The preamble includes an L-STF (Legacy Short Training Field), an L-LTF (Legacy Long Training Field), an L-SIG (Legacy Signal Field), an EHT-SIG-A (Extremely High Throughput Signal A Field), an EHT-STF (EHT Short Training Field), and an EHT-LTF (EHT Long Training Field), and the EHT-SIG-A includes a subfield indicating whether data are concurrently transmitted from a plurality of communication devices to a common partner device.

20 Claims, 6 Drawing Sheets

(58) Field of Classification Search
CPC . H04W 72/21; H04W 74/04; H04W 74/0808; H04W 88/08; H04W 72/0446; H04W 72/0453; H04W 72/20; H04W 24/10; H04W 28/18; H04W 48/16; H04W 72/046; H04W 88/02; H04W 52/0225; H04W 72/044; H04W 72/12; H04W 74/002; H04W 74/006; H04W 16/28; H04L 5/0053; H04L 27/2602; H04L 5/0048; H04L 27/2603; H04L 5/0023; H04L 5/0007; H04L 27/26; H04L 5/0094; H04L 25/03006; H04L 2025/03815; H04L 5/0035; H04L 1/00; H04L 27/2613; H04L 5/0091; H04L 5/0041; H04L 1/0003; H04L 1/0025; H04L 1/1614; H04L 5/0037; H04L 69/322; H04L 1/08; H04L 27/26132; H04L 27/2666; H04L 27/34
USPC .......................................... 370/329, 328, 252
See application file for complete search history.

(56) References Cited

U.S. PATENT DOCUMENTS

| | | | |
|---|---|---|---|
| 2012/0051312 A1* | 3/2012 | Noh | H04W 4/00 370/329 |
| 2015/0146808 A1* | 5/2015 | Chu | H04L 5/0094 375/260 |
| 2015/0168536 A1* | 6/2015 | Banin | H04W 64/00 455/456.2 |
| 2015/0288428 A1 | 10/2015 | Choi | |
| 2015/0295629 A1 | 10/2015 | Xia et al. | |
| 2016/0080124 A1 | 3/2016 | Liang | |
| 2016/0156438 A1* | 6/2016 | Sun | H04L 27/2602 370/330 |
| 2018/0263045 A1 | 9/2018 | Zhou et al. | |
| 2018/0317128 A1 | 11/2018 | Chun et al. | |
| 2019/0007130 A1* | 1/2019 | Fang | H04B 7/022 |
| 2019/0116513 A1* | 4/2019 | Verma | H04W 74/002 |
| 2020/0059808 A1* | 2/2020 | Lim | H04W 72/04 |
| 2020/0145157 A1* | 5/2020 | Suh | H04L 5/0048 |

FOREIGN PATENT DOCUMENTS

| | | |
|---|---|---|
| CN | 106664165 A | 5/2017 |
| CN | 107612603 A | 1/2018 |
| EP | 3972177 A1 | 3/2022 |
| JP | 2017-011486 A | 1/2017 |
| JP | 2018-050133 A | 3/2018 |
| JP | 7273540 B2 | 5/2023 |
| WO | 2018/222177 A1 | 12/2018 |

OTHER PUBLICATIONS

Notice of Reasons for Refusal issued by the Japanese Patent Office on Dec. 23, 2022 in corresponding JP Patent Application No. 2019-036402, with English translation.
Chinese Office Action issued in corresponding CN Patent Application No. 202080016900.9, dated Sep. 1, 2023, with English translation.
International Search Report issued by the Japan Patent Office on Mar. 24, 2020 in corresponding International Application No. PCT/JP2020/004258, with English translation.
Park, E. et al., "Overview of PHY features for EHT" IEEE 802.11-18/1967r0 (Nov. 2018) pp. 1-23.
Latif, I. et al., "HARQ in EHT" IEEE 802.11-18/2029r0 (Nov. 2018) pp. 1-8.
Korean Office Action issued in corresponding KR Patent Application No. 10-2021-7029348 dated Dec. 29, 2023, with English translation.
Latif, I. et al., "HARQ in EHT" IEEE 802.11-18/2029r1 (Nov. 2018) pp. 1-12.
Japanese Office Action issued in corresponding JP Patent Application No. 2023-074949 dated Mar. 8, 2024, with English translation.
Notice of Allowance issued by the Korean Patent Office on Jun. 19, 2024 in corresponding KR Patent Application No. 10-2021-7029348, with English translation.
Korean Office Action issued in corresponding KR Patent Application No. 10-2024-7030295, dated Sep. 29, 2024, with English translation.
EP Office Action issued in corresponding EP Patent Application No. 20762492.5, dated Mar. 5, 2025, pp. 1-5.
Notice of Allowance issued by the Korean Patent Office on Mar. 19, 2025 in corresponding KR Patent Application No. 10-2024-7030295, with English translation.

* cited by examiner

COMMUNICATION DEVICE, COMMUNICATION METHOD THEREOF, INFORMATION PROCESSING DEVICE, CONTROL METHOD THEREOF, AND COMPUTER-READABLE STORAGE MEDIUM

CROSS-REFERENCE TO RELATED APPLICATIONS

This application is a Continuation of International Patent Application No. PCT/JP2020/004258, filed Feb. 5, 2020, which claims the benefit of Japanese Patent Application No. 2019-036402 filed Feb. 28, 2019, both of which are hereby incorporated by reference herein in their entirety.

BACKGROUND OF THE INVENTION

Field of the Invention

The present invention relates to a communication device, a communication method thereof, an information processing device, a control method thereof, and a computer-readable storage medium and, more particularly, to a communication control technique in a wireless LAN.

Background Art

Along with the increase in data amount to be communicated in recent years, communication techniques such as a wireless LAN (Local Area Network) have been developed. As a major communication standard of the wireless LAN, the IEEE (Institute of Electrical and Electronics Engineers) 802.11 standard series is known. The IEEE802.11 standard series includes standards such as IEEE802.11a/b/g/n/ac/ax. For example, in the latest standard, IEEE802.11ax, a technique that uses OFDMA (Orthogonal Frequency-Division Multiple Access) to implement a high peak throughput of up to 9.6 gigabits per second (Gbps) and additionally improve the communication speed under a congestion situation has been standardized (see PTL 1).

On the other hand, in order to further improve throughput, a study group called IEEE802.11EHT (Extremely High Throughput) has been formed as a successor standard of IEEE802.11ax. In the EHT, to achieve throughput improvement, assigning transmission data for a single STA (Station) to a plurality of access points (APs) arranged while being spatially distributed and causing these to concurrently transmit the data to the STA has been examined.

CITATION LIST

Patent Literature

PTL 1: Japanese Patent Laid-Open No. 2018-050133

It is useful to recognize whether an STA receives a frame from a single AP or receives frames from a plurality of APs. On the other hand, in the conventional standard, an STA is assumed to communicate with a single AP but not assumed to concurrently communicate with a plurality of APs. For this reason, there exists no mechanism configured to allow the STA to recognize that frames are concurrently transmitted from a plurality of APs.

SUMMARY OF THE INVENTION

The present invention provides a technique of enabling to recognize whether a terminal of a wireless LAN is concurrently communicating with a plurality of access points.

According to one aspect of the present invention, there is provided a communication device that transmits a radio frame including a preamble and a data field of a physical layer (PHY), wherein the preamble includes an L-STF (Legacy Short Training Field), an L-LTF (Legacy Long Training Field), an L-SIG (Legacy Signal Field), an EHT-SIG-A (Extremely High Throughput Signal A Field), an EHT-STF (EHT Short Training Field), and an EHT-LTF (EHT Long Training Field), and the EHT-SIG-A includes a subfield indicating whether data is concurrently transmitted from another communication device different from the communication device to a common partner device.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Network Configuration)

Figure 1:
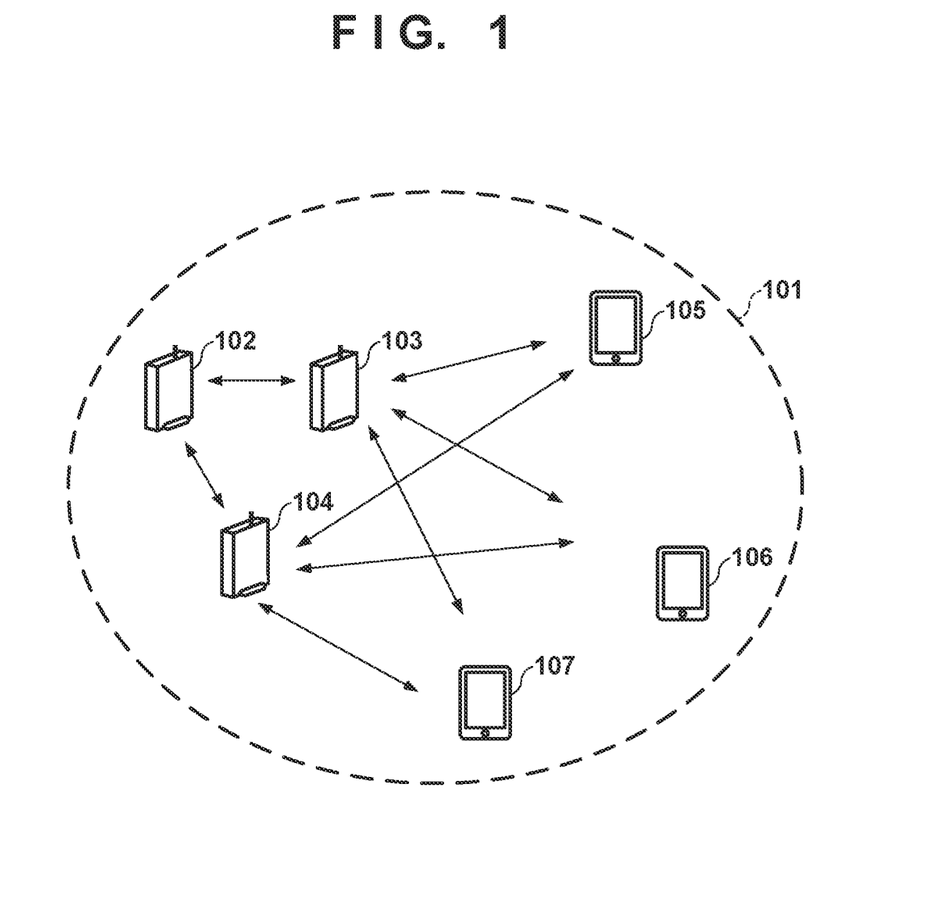
FIG. 1 is a view showing an example of the configuration of a network.

FIG. 1 shows an example of the configuration of a wireless communication network according to this embodiment. This wireless communication network is configured to include access points (AP 102, AP 103, and AP 104) and terminals (STA 105, STA 106, and STA 107), each of which is an EHT (Extremely High Throughput) device. Each of these devices complies with IEEE802.11EHT (Extremely High Throughput), and is configured to be capable of performing wireless communication complying with standards defined before the IEEE802.11EHT standard. Note that the name "IEEE802.11EHT" is provided for convenience, and can be another name when the standard was established, but this specification and the appended claims are to cover all the standards that can support the processing to be described later. In the following description, in a case in which a specific device is not referred to or the like, the access point may be referred to as "AP" and the station may be referred to as "STA" without reference numerals. Note that in FIG. 1, the wireless communication network including three APs and three STAs is shown as an example, but the numbers of these communication devices may be two or less or four or more. In FIG. 1, the communicable area of the network formed by the AP 102, the AP 103, and the AP 104 is indicated by a circle 101. Note that this communicable area may cover a larger area, or may cover only a smaller area. In addition, although FIG. 1 shows STAs that support EHT, an STA that supports only a standard (legacy standard) of a generation before EHT may exist. Note that it may be understood that EHT is an acronym of Extreme High Throughput.

Note that in this example, the AP 103 and the AP 104 can receive a signal transmitted from the AP 102, and the AP 102 can receive signals transmitted from the AP 103 and the AP 104. However, the connection form is not particularly limited, and the AP 102, the AP 103, and the AP 104 may be connected by a wire or wirelessly. Note that the AP 103 and the AP 104 may be able or unable to transmit/receive signals to/from each other. Note that the AP 102 to the AP 104 can form the Multi-AP Coordination configuration of the IEEE802.11EHT. That is, the AP 102 to the AP 104 support a configuration in which a plurality of APs cooperatively communicate with one STA, as defined by IEEE802.11EHT. For example, the STA 105 can concurrently transmit/receive radio frames to/from the AP 103 and the AP 104, which cooperatively operate. The STA 105 can be configured to, for example, include a plurality of wireless LAN control units and transmit/receive radio frames to/from a plurality of APs using different radio channels. Note that the STA 105 may include one physical control unit capable of processing a plurality of frames concurrently received via a plurality of radio channels. That is, the STA 105 has a configuration capable of logically concurrently processing a plurality of wireless communications physically using one or a plurality of control devices.

Here, an AP that directly transmits/receives signals to/from each STA, like the AP 103 and the AP 104, w-ill be referred to as a slave access point (S-AP). Also, an AP capable of at least indirectly transmitting/receiving frames to/from each STA by issuing instructions to the AP 103 and the AP 104, like the AP 102, will be referred to as a master access point (M-AP). Note that the M-AP may directly transmit/receive signals to/from the STA 105. For example, the AP 102 can operate as an M-AP or an S-AP. In this case, for example, the AP 102 may issue an instruction to the AP 103 or the AP 104 to cause it to transmit/receive a radio frame to/from an STA while performing transmission/reception of radio frames between the self-device and the STA 105. Note that when causing an S-AP to transmit a radio frame, the M-AP can transmit transmission target data to the S-AP. However, the present invention is not limited to this, and the S-AP may directly obtain the transmission target data from, for example, the Internet. In addition, the M-AP can receive, from the S-AP, data that the S-AP has received from an STA. The S-AP may transfer the data received from the STA not to the M-AP but to the partner device of the STA.

Note that all APs in the same network can operate as M-APs, and which AP should operate as an M-AP can be decided based on a certain criterion. Note that the M-AP does not operate as an AP for beacon transmission or the like, and may execute only the role of an M-AP to, for example, send an instruction to each AP. Also, each AP may operate as a plurality of S-APs by including a plurality of wireless LAN control units. The M-AP may be implemented as a logical function, and one physical AP may operate as one or more S-APs while operating as an M-AP.

Examples of the configuration and processing of each of the AP 103 and the AP 104, as an AP (S-AP) that directly transmits a radio frame to an STA, will be described below.
(Configuration of AP)

Figure 2:
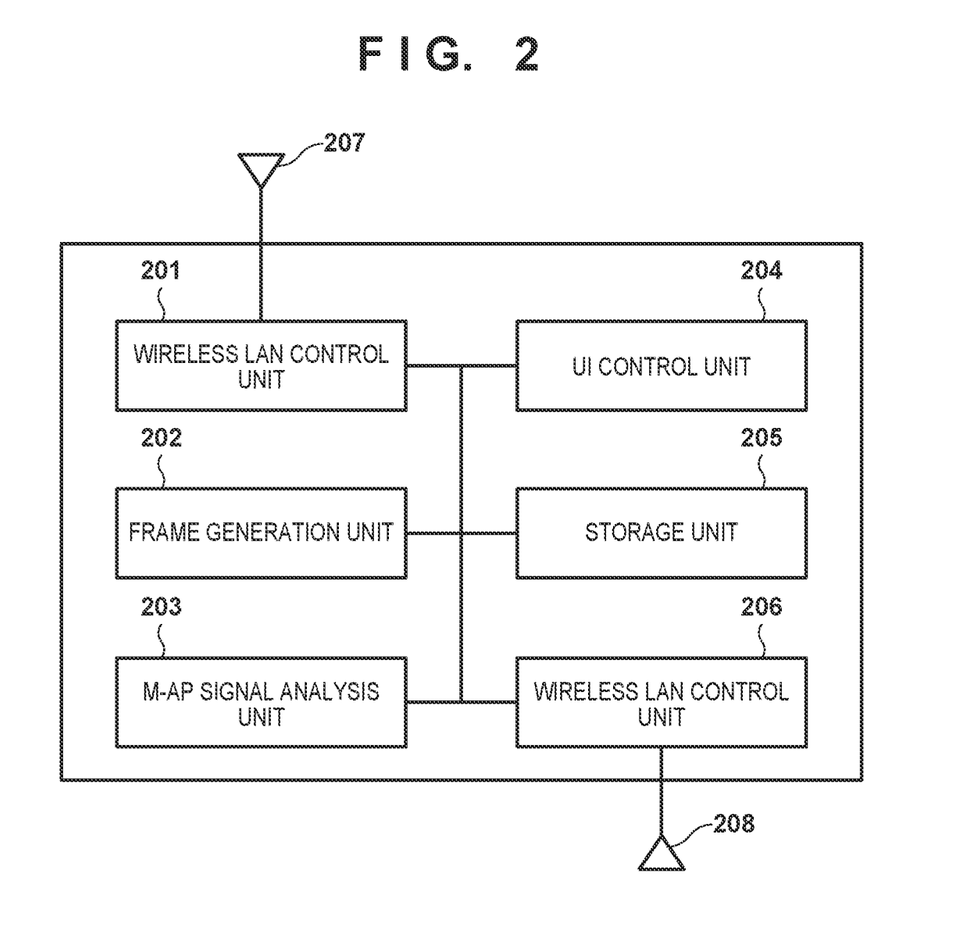
FIG. 2 is a block diagram showing an example of the functional configuration of an AP.

FIG. 2 shows the functional configuration of the AP 103. Note that the AP 104 has the same functions. As an example, the AP 103 includes two sets of function units (a wireless LAN control unit 201 and an antenna 207, and a wireless LAN control unit 206 and an antenna 208) configured to perform communication of a wireless LAN. The number of wireless LAN control units provided in the AP 103 is not limited to two, and may be one or three or more. The AP 103 further includes a frame generation unit 202, an M-AP signal analysis unit 203, a UI control unit 204, and a storage unit 205.

The wireless LAN control unit 201 and the wireless LAN control unit 206 are each configured to include circuits that transmit/receive radio signals to/from another wireless LAN device (for example, another AP or STA), and programs configured to control these. The wireless LAN control unit 201 and the wireless LAN control unit 206 each execute communication control of wireless LAN such as transmission of a frame generated by the frame generation unit 202 and reception of a radio frame from another wireless LAN device in accordance with the IEEE802.11 standard series. The frame generation unit 202 generates a radio frame to be transmitted by each of the wireless LAN control unit 201 and the wireless LAN control unit 208 based on contents analyzed by the M-AP signal analysis unit 203. Note that if the AP operates as an M-AP or does not cooperate with another AP, the frame generation unit 202 may generate a radio frame independently of the analysis by the M-AP signal analysis unit 203. If the self-device (AP 103) operates as an S-AP, the M-AP signal analysis unit 203 interprets the contents of a radio frame that is received from an M-AP and is to be transmitted to an STA. For example, concerning a frame to be transmitted from the AP 103 to the STA 105, pieces of information concerning how many APs that transmit frames to the STA 105 exist in addition to the AP 103, which channel is to be used for transmission/reception, and the like are obtained by this analysis.

The UI control unit 204 is configured to include hardware concerning user interfaces (UIs) such as a touch panel and buttons configured to accept an operation on the AP 103 by the user (not shown) of the AP 103, and programs configured to control these. Note that the UI control unit 204 also has a function of, for example, presenting information to the user, such as display of an image or the like or audio output. The storage unit 205 is configured to include a storage device such as a ROM (Read Only Memory) or a RAM (Random Access Memory) configured to store programs to be executed by the AP 103 and various kinds of data.

Figure 3:
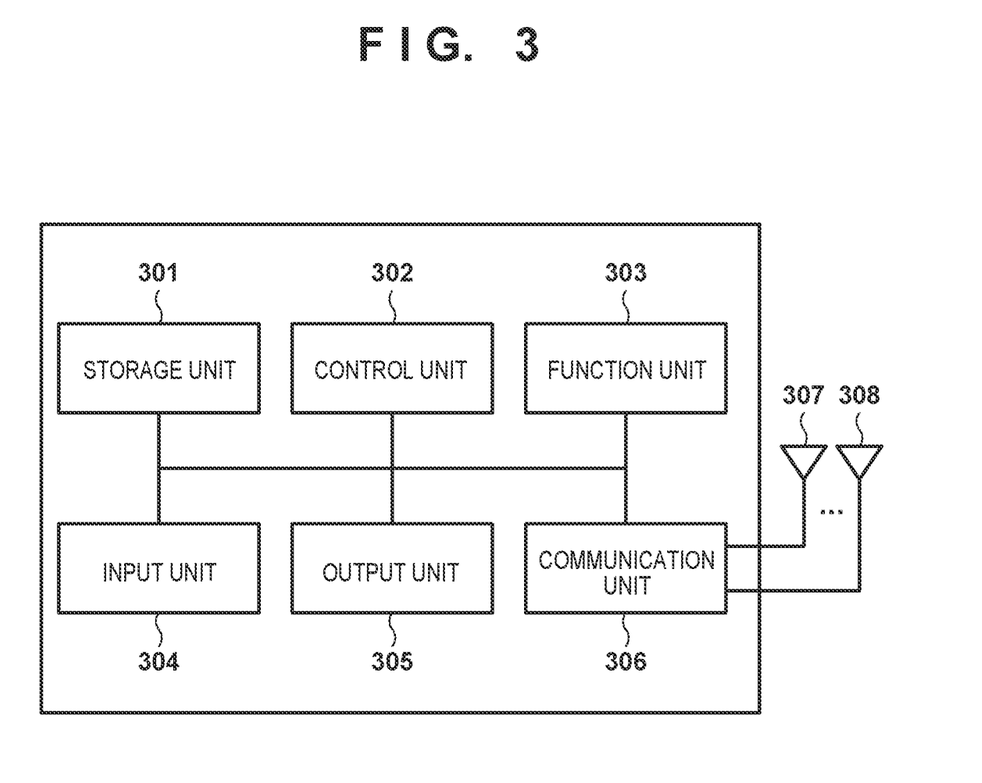
FIG. 3 is a block diagram showing an example of the hardware configuration of the AP.

FIG. 3 shows the hardware configuration of each of the AP 103. The AP 103 includes, as an example of its hardware configuration, a storage unit 301, a control unit 302, a function unit 303, an input unit 304, an output unit 305, a communication unit 306, and antennas 307 and 308. Note that the AP 104 and the STAs can have the same hardware configuration. Note that since the STA has a general wireless LAN function, a description of its functional configuration will be omitted.

The storage unit 301 is formed by both of a ROM and a RAM or one of them, and stores programs for performing various kinds of operations to be described later and various kinds of information such as communication parameters for wireless communication. Note that other than the memories such as a ROM and a RAM, a storage medium such as a flexible disk, a hard disk, an optical disk, a magnetooptical disk, a CD-ROM, a CD-R, a magnetic tape, a nonvolatile memory card, or a DVD may be used as the storage unit 301.

The control unit 302 is formed by, for example, one or more processors such as a CPU and an MPU, an ASIC (Application Specific Integrated Circuit), a DSP (Digital Signal Processor), an FPGA (Field Programmable Gate Array), or the like. Here, CPU is an acronym of Central Processing Unit, and MPU is an acronym of Micro Processing Unit. The control unit 302 executes the programs stored in the storage unit 301, thereby controlling the entire AP 103. Note that the control unit 302 may control the entire AP 103 by cooperation of the programs stored in the storage unit 301 and an OS (Operating System).

In addition, the control unit 302 controls the function unit 303 to execute predetermined processing such as image capturing, printing, or projection. The function unit 303 is hardware used by the AP 103 to execute predetermined processing. For example, if the AP 103 is a camera, the function unit 303 is an image capturing unit and performs image capturing processing. For example, if the AP 103 is a printer, the function unit 303 is a printing unit and performs print processing. For example, if the AP 103 is a projector, the function unit 303 is a projection unit and performs projection processing. Data to be processed by the function unit 303 may be data stored in the storage unit 301, or may be data communicated with another AP or STA via the communication unit 306 to be described later.

The input unit 304 accepts various kinds of operations from a user. The output unit 305 performs various kinds of outputs for the user. Here, the output by the output unit 305 includes, for example, at least one of display on a screen, audio output by a loudspeaker, vibration output, and the like. Note that both the input unit 304 and the output unit 305 may be implemented by one module, like a touch panel.

The communication unit 306 controls wireless communication complying with the IEEE802.11 standard series, or controls IP communication. The communication unit 306 is a so-called radio chip, and may itself include one or more processors and memories. In this embodiment, the communication unit 306 can execute processing complying with at least the IEEE802.11ax standard. In addition, the communication unit 306 controls the antennas 307 and 308 to transmit and receive radio signals for wireless communication. The AP 103 communicates contents such as image data, document data, or video data with another communication device via the communication unit 306. Each of the antennas 307 and 308 is an antenna that can transmit and receive signals in at least any one of, for example, a sub-GHz band, 2.4 GHz band, 5 GHz band, and 6 GHz band. Note that the frequency band (and a combination of frequency bands) to which the antennas 307 and 308 are adaptable is not particularly limited. Each of the antennas 307 and 308 may be one antenna, or may be configured to include two or more antennas to perform MIMO (Multi-Input and Multi-Output) transmission/reception. Note that FIG. 3 shows at least two antenna 307 and 308, but the AP 103 may include only one antenna by using, for example, a multiband antenna that supports two or more of the plurality of frequency bands described above. Also, the AP 103 may include more antennas.

(Procedure of Processing)

Figure 4:
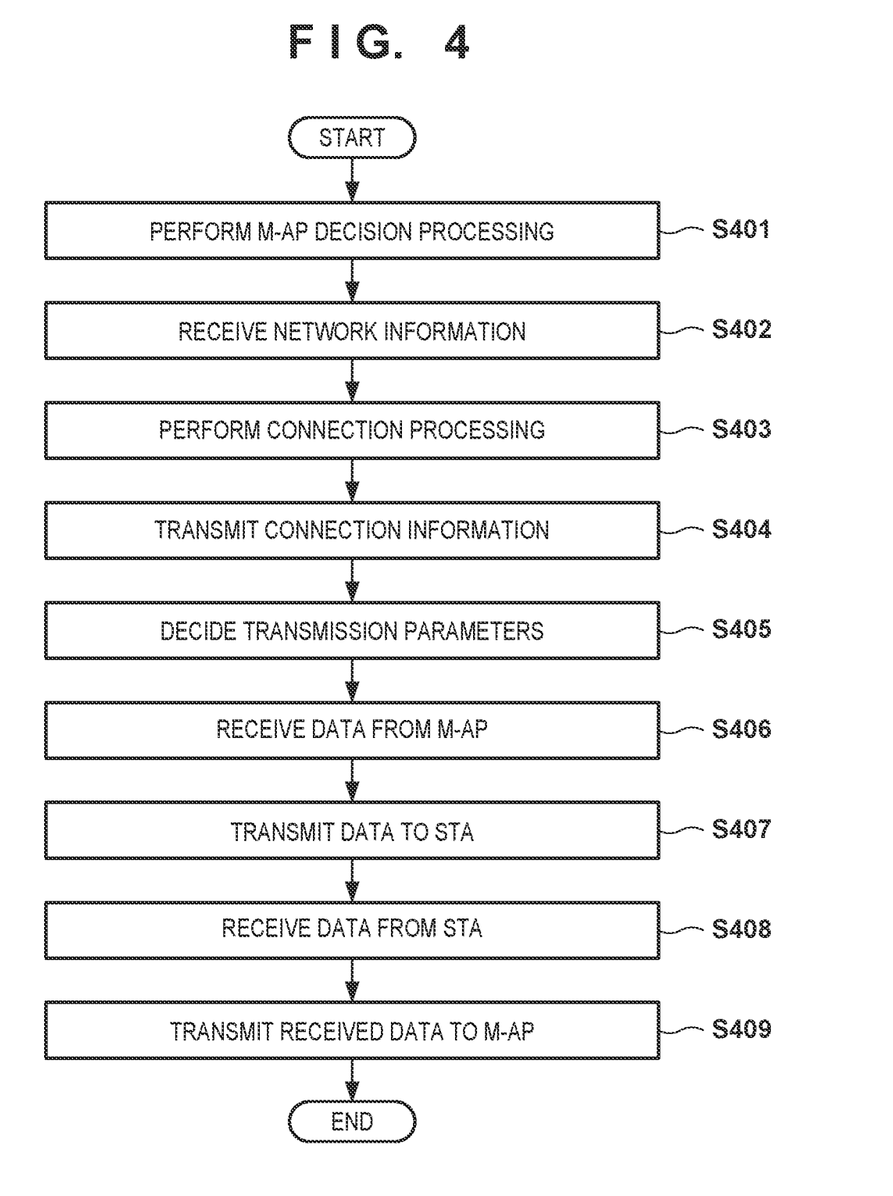
FIG. 4 is a flowchart showing an example of the procedure of processing executed in the AP.
Figure 5:
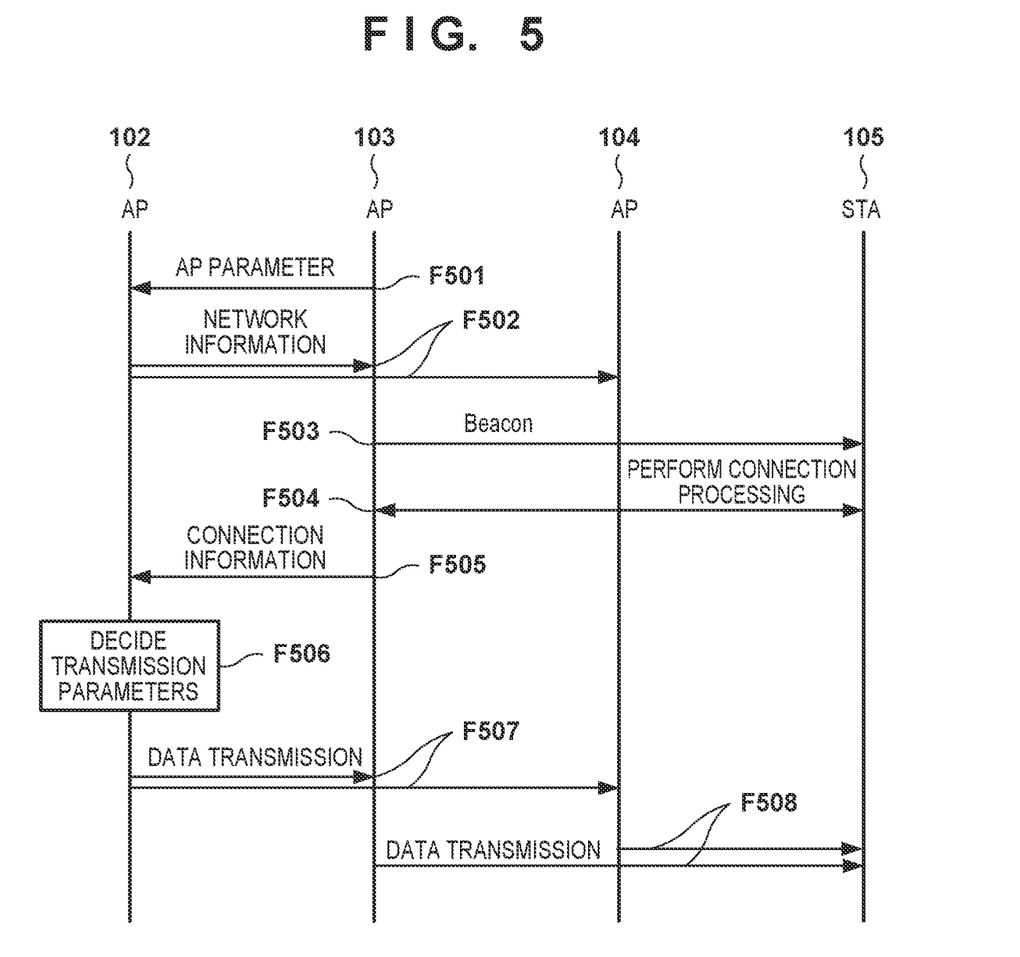
FIG. 5 is a sequence chart showing an example of the procedure of processing executed in a network.

Examples of the procedure of processing executed by the AP 103 and the AP 104 as described above and the procedure of processing executed by a wireless communication network will be described next. FIGS. 4 and 5 shows an example of the procedure of processing of deciding that the AP 103 should operate as an S-AP, and after information exchange with the AP 102, transmitting data to the STA 105 in cooperation with the AP 104.

In this processing, first, which AP should operate as an M-AP (and which AP should operate as an S-AP) is decided among the AP 102 to the AP 104 (step S401). For example, a parameter as an AP is transmitted from the AP 103 to the AP 102 (F501), and parameters are compared, thereby deciding an AP that should operate as an M-AP. Note that the AP parameter can also be transmitted from the AP 104 to the AP 102 (not shown). Note that in this processing example, it is decided that the AP 102 should operate as an M-AP, and the AP 103 and the AP 104 should operate as S-APs. After that, the AP 102 operating as the M-AP notifies the APs 103 and 104 operating as the S-APs of network information such as an SSID and a BSSID. The AP 103 and the AP 104 receive the notified network information (step S402, F502). Note that if the roles of the M-AP and the S-APs are determined in advance, the processes of steps S401 and S402 and F501 and F502 may be omitted.

The AP 103 transmits a beacon in accordance with the notified information (F503). Note that the beacon includes information indicating that a plurality of APs can cooperatively perform data transmission/reception to the connected STA. Note that the APs here include logical APs, and one AP can include, for example, an AP that operates in the 2.4 GHz band and an AP that operates in the 5 GHz band. That is, data transmission/reception by the plurality of APs can include data transmission/reception by one physical AP capable of operating as a plurality of logical APs. The AP 103, for example, adds a Multi-AP Information Element into the beacon and transmits information including the information of SSIDs, BSSIDs, and operation radio channels to be used by the plurality of APs capable of cooperatively operating. The storage method and configuration of these pieces of information are not limited to these, and the AP 103 may transmit similar information stored in a similar format. Upon receiving the beacon, the STA 105 performs connection processing to at least one of the plurality of S-APs based on the information included in the beacon (step S403, F504). The connection processing here includes processing such as authentication and association defined by the IEEE802.11 standard series. In a connection state in which connection with the STA 105 is established, the AP 103 notifies the M-AP that the connection state with the STA is established, in addition to connection parameters (step S404, F505). At this time, if one physical AP serves as two logical APs, and each of these is set in the connection state with the STA, the M-AP may be notified of this. Note that in FIG. 5, only the AP 103 is set in the connection state with the STA 105. However, the AP 104 can also be connected to the STA 105 by transmitting the beacon and notify the M-AP (AP 102) that the connection state is established. However, the present invention is not limited to this and, for example, the STA may be set in the connection state with only one of the plurality of S-APs. In this case, for example, a radio frame transmitted from another S-AP that is not in the connection state is handled by the STA as a radio frame from an S-AP that is in the connection state. Note that even in the connection state with only one of the plurality of S-APs, the STA may be able to recognize that the transmission source S-APs are different concerning radio frames from the S-APs. Note that in this embodiment, the preamble of the physical layer (PHY) of the radio frame is decoded, thereby enabling to recognize that signals are transmitted from the plurality of S-APs (that the Multi-AP Coordination system is formed). That is, information representing that the Multi-AP Coordination system is formed is included in the PHY preamble of a frame that the S-AP has received from the M-AP or a frame that the STA has received from the S-AP (or the M-AP). This allows the device that has received the frame to confirm whether a single or a plurality of APs transmit data to the STA. This will be described later.

The M-AP manages the connection parameters of the S-AP that is in the connection state with the STA, thereby deciding transmission parameters based on the information and performing transmission data assignment later (F506). The S-AP is notified of the information of the transmission parameters decided by the M-AP, and the AP 103 decides the transmission parameters of its own based on the notified information (step S405). The connection parameters may include the information of the transmission rate and the error rate of each connection. The M-AP can assign a large amount of transmission data to an S-AP having connection of a high transmission rate and assign a small amount of transmission data to an S-AP having connection of a low transmission rate. According to this, data transmission from the S-APs to the STA can efficiently be executed. To reflect the current connection situation, the connection parameters may be updated at a predetermined period in each S-AP and notified to the M-AP. After that, upon receiving the transmission data from the M-AP to the STA (step S406, F507), the S-AP transmits the data to the STA (step S407, F508).

Such concurrent transmission of data from the plurality of S-APs to one STA can be performed by, for example, transmitting a trigger frame configured to trigger transmission from the M-AP to the S-APs after the transmission target data is transmitted from the M-AP to the S-APs. That is, in a state in which preparation of the transmission target data is completed, the S-APs transmit the data to the STA at once based on reception of the trigger frame from the M-AP. Note that when the transmission target data is transmitted from the M-AP to the S-APs, the S-APs may be notified of information for instructing the transmission timing of the data together with the transmission target data. In this case, the plurality of S-APs transmit the transmission target data at the instructed transmission timing, thereby concurrently transmitting the data to the STA.

On the other hand, upon receiving data from the STA (step S408), the S-AP transmits the received data to the M-AP (step S409). Note that the order of data transmission and reception is an example and, for example, data may be transmitted/received in a mode other than the mode shown in FIGS. 4 and 5 such that, for example, data reception from the STA is performed before data transmission to the STA.

(Frame Structure)

Figure 6:
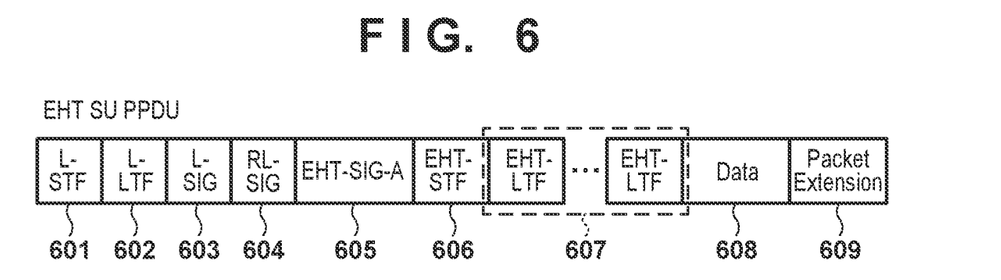
FIG. 6 is a view showing an example of the PHY frame structure of an EHT SU PPDU.
Figure 7:
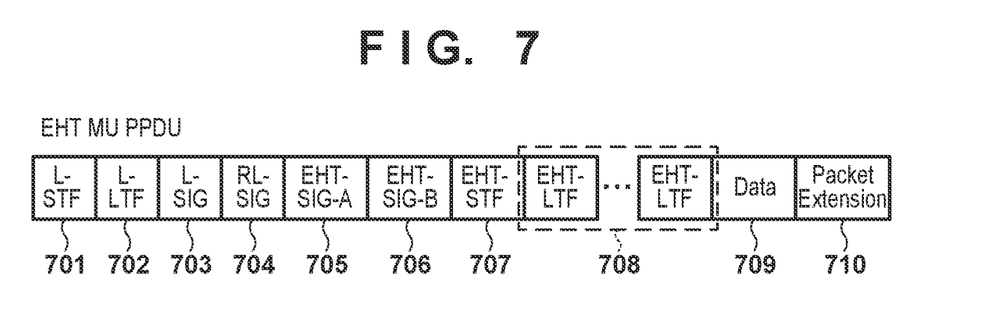
FIG. 7 is a view showing an example of the PHY frame structure of an EHT MU PPDU.
Figure 8:
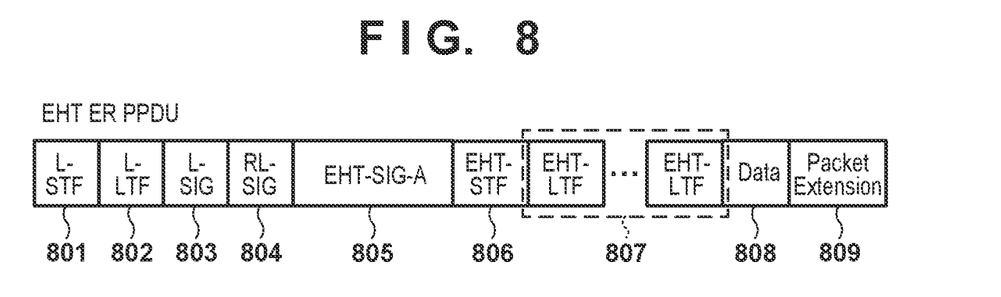
FIG. 8 is a view showing an example of the PHY frame structure of an EHT ER PPDU.

Each of FIGS. 6 to 8 shows an example of a PPDU (Physical Layer (PHY) Protocol Data Unit) defined by the IEEE802.11EHT standard and transmitted in steps S406 and S407, F503, F507, and F508. FIG. 6 shows an example of an EHT SU (Single User) PPDU that is a PPDU for single-user communication, and FIG. 7 shows an example of an EHT MU (Multi User) PPDU for multi-user communication. FIG. 8 shows an example of an EHT ER (Extended Range) PPDU for long distance transmission. The EHT ER PPDU is used when the communication area should be extended in communication between an AP and a single STA.

The PPDU includes fields including an STF (Short Training Field), an LTF (Long Training Field), and a SIG (Signal Field). As shown in FIG. 6, the PPDU head portion includes an L (Legacy)-STF 601, an L-LTF 602, and an L-SIG 603 for ensuring backward compatibility with the IEEE802.11a/b/g/n/ax standards. Note that each of frame formats shown in FIGS. 7 and 8 includes an L-STF (L-STF 701 or L-STF 801), an L-LTF (L-LTF 702 or L-LTF 802), and an L-SIG (L-SIG 703 or L-SIG 803). Note that the L-LTF is arranged immediately after the L-STF, and the L-SIG is arranged immediately after the L-LTF. Note that each of the structures shown in FIGS. 6 to 8 further includes an RL-SIG (Repeated L-SIG, RL-SIG 604, RL-SIG 704, or RL-SIG 804) arranged immediately after the L-SIG. In the RL-SIG field, the contents of the L-SIG are repeatedly transmitted. The RL-SIG is used to enable a receiver to recognize that this PPDU complies with a standard after the IEEE802.11ax standard, and may be omitted in IEEE802.11EHT in some cases. In addition, a field for enabling the receiver to recognize that this PPDU complies with the IEEE802.11EHT may be provided in place of the RL-SIG. Note that the respective fields of each PPDU may not necessarily be arranged in the order shown in each of FIGS. 6 to 8, or may include a new field not shown in each of FIGS. 6 to 8.

The L-STF 601 is used for detection of a PHY frame signal, AGC (Automatic Gain Control), timing detection, or the like. The L-LTF 602 is used for highly accurate frequency/time synchronization, obtainment of propagation channel information (CSI: Channel State Information), or the like. The L-SIG 603 is used for transmitting control information including information such as a data transmission rate and a PHY frame length. A legacy device complying with the IEEE802.11a/b/g/n/ax standards can decode the above-described various kinds of legacy fields.

Each PPDU further includes an more EHT-SIG (EHT-SIG-A 605, EHT-SIG-A 705, EHT-SIG-B 706, or EHT-SIG-A 805) arranged immediately after the RL-SIG and used for transmitting control information for EHT. Each PPDU further includes an STF for EHT (EHT-STF 606, 707, or 806) and an LTF for EHT (EHT-LTF 607, 708, or 807). Each PPDU includes, after these controlling fields, a data field 608, 709, or 808 and a Packet extension field 609, 710, or 809. The portion including the fields from the L-STF to the EHT-LTF of each PPDU is referred to as a PHY preamble.

Note that each of FIGS. 6 to 8 shows the PPDU that can ensure the backward compatibility as an example. However, if it is unnecessary to ensure the backward compatibility, for example, the legacy fields may be omitted. In this case, for example, the EHT-STF and EHT-LTF are used in place of the L-STF and the L-LTF to establish synchronization. Then, in this case, the EHT-STF and one of the plurality of EHT-LTFs after the EHT-SIG field can be omitted.

The EHT-SIG-A 605 and 805 included in the EHT SU PPDU and the EHT ER PPDU include an EHT-SIG-A1 and an EHT-SIG-A2 necessary for reception of the PPDU, respectively, as shown in Tables 1 and 2 below. In this embodiment, a "Multi-AP" subfield representing whether data is transmitted from a plurality of APs to an STA is included in the EHT-SIG-A1. Also, the EHT-SIG-A 705 of the EHT MU PPDU shown in FIG. 7 includes an EHT-SIG-A1 and an EHT-SIG-A2 necessary for reception of the PPDU as shown in Tables 3 and 4 below. In this embodiment, the "Multi-AP" subfield representing whether data is transmitted from a plurality of APs to an STA is included in the EHT-SIG-A2. For example, if data is transmitted from a plurality of APs to an STA, 1 is stored in the "Multi-AP" subfield. If data is transmitted from a single AP to an STA, 0 is stored in the "Multi-AP" subfield. Note that the configurations of Tables 1 to 4 are merely examples and, for example, in the EHT SU PPDU and the EHT ER PPDU, the information of Multi-AP may be notified at a position other than the 15th bit of the EHT-SIG-A1 field. Similarly, in the EHT MU PPDU, the information of Multi-AP may be notified at a position other than the eighth bit of the EHT-SIG-A2 field. Also, the information of Multi-AP may designate whether data is transmitted from a plurality of physical APs to an STA, or may designate whether data is transmitted from a plurality of logical APs to an STA. For example, even if data is physically transmitted from one AP to an STA, if data is logically transmitted from a plurality of APs to an STA, 1 may be designated in Multi-AP subfield.

TABLE 1

| | Bit Position | Subfield | Bit Count | Description |
|---|---|---|---|---|
| EHT-SIG-A1 | B0 | Format | 1 | "1" is set for an EHT PPDU and an EHT ER PPDU to distinguish them from an EHT TB PPDU. |
| | B1 | Beam Change | 1 | "1" is set if the pre-EHT of the PPDU is arranged in a space different from the first symbol of the EHT-LTF, or "0" is set if the pre-EHT is mapped similarly to the first symbol. |
| | B2 | UL/DL | 1 | This subfield indicates whether the PPDU is for UL or DL, and has the same value as TXVECTOR UPLINK_ FLAG. |
| | B3-B6 | MCS | 4 | This subfield indicates the value of the Modulation and Coding Scheme. In a case of an EHT SU PPDU, n = 0, 1, 2, . . . , 11 (12 to 15 are reserved). In a case of an EHT ER SU PPDU and Bandwidth = 0, n = 0, 1, 2 (3 to 15 are reserved areas). In a case of an EHT ER SU PPDU and Bandwidth = 1, n = 0 for MCS 0 (1 to 15 are reserved areas). |
| | B7 | DCM | 1 | This subfield indicates whether Dual Carrier Modulation is applied to the data field. If "0" is set in the STBC field, "1" is set. (If both the DCM and STBC fields are "1", neither of them is applied) If DCM is not applied, "0" is set. |
| | B8-B13 | BSS Color | 6 | 6-bit number for identifying the BSS |
| | B14 | Multi-AP | 1 | "1" is set if data transmission/reception is performed with a plurality of APs. "0" is set if data transmission/reception is performed with a single AP. |
| | B15-B18 | Spatial Reuse | 4 | This subfield indicates whether Spatial Reuse is allowed during transmission of this PPDU. The value of Spatial Reuse field encoding shown in the separate table is set. |
| | B19-B20 | Bandwidth | 2 | In a case of an EHT SU PPDU: "0" is set for 20 MHz, "1" is set for 40 MHz, "2" is set for 80 MHz, or "3" is set for 160 MHz (80 + 80 MHz). In a case of an EHT ER SU PPDU: "0" is set for 242-tone RU, or "1" is set for upper 106-tone RU of 20 MHz. |
| | B21-B22 | GI + LTF Size | 2 | This subfield indicates the Guard Interval period and the EHT-LTF size. "0" is set for 1 × EHT-LTF and 0.8 μs GI, "1" is set for 2 × EHT-LTF and 0.8 μs GI, "2" is set for 2 × EHT-LTF and 1.6 μs GI, "3" is set if both the DCM and STBC fields are "1" and for 4 × EHT-LIF and 0.8 μs GI, or "3" is set for 4 × EHT-LTF other than the above case and 3.2 μs GI. |

TABLE 1-continued

| Bit Position | Subfield | Bit Count | Description |
|---|---|---|---|
| B23-B25 | NSTS And Midamble, Periodicity | 2 | This subfield indicates the number of space-time streams and the midamble period for frame synchronization.<br>If the Doppler field is "0", "(the number of space-time streams) − 1" is set.<br>If the Doppler field is "1", B23 and B24 indicate the number of space-time streams.<br>B25 is "0" if the midamble period is 10, or "1" if the midamble period is 20. |

TABLE 2

| | Bit Position | Sub-field | Bit Count | Description |
|---|---|---|---|---|
| EHT-SIG-A2 | B0-B6 | TXOP | 1 | Transmission Opportunity<br>if TXOP_DURATION of TXVECTOR is UNSPECIFIED and there is no period information, 127 is set.<br>If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION − 512)/8 is set in B1 to B6. |
| | B7 | Coding | 1 | "0" is set for BCC (Binary Convolutional Code), or "1" is set for LDPC (Low Density Parity Check). |
| | B8 | LDPC Extra Symbol Segment | 1 | This subfield indicates the presence/absence of an extra OFDM symbol segment for LDPC. |
| | B9 | STBC | 1 | "1" is set in this field if STBC (Space-Time Block Coding) is used and the DCM subfield is "0", "1" is also set if neither DCM nor STBC is applied, or "0" is set otherwise. |
| | B10 | Beamformed | 1 | "1" is set if beamforming steering is applied to the waveform of SU transmission. |
| | B11-B12 | Pre-FEC Padding Factor | 2 | "0" is set if the Pre-FEC Padding Factor is 4<br>"1" is set if the Pre-FEC Padding Factor is 1,<br>"2" is set if the Pre-FEC Padding Factor is 2, or<br>"3" is set if the Pre-FEC Padding Factor is 3. |
| | B13 | PE Disainbiguity | 1 | Disambiguity field of Packet Extension |
| | B14 | Reserved | 1 | Reserved field |
| | B15 | Doppler | 1 | "1" is set if either of the following conditions is met:<br>the number of OFDM symbols in the data field is larger than "the value indicated by the midamble period + 1", and a midamble exists, and<br>the number of OFDM symbols in the data field is equal to or smaller than "the value indicated by the midamble period + 1", no midamble exists, and the channel changes rapidly. |
| | B16-B19 | CRC | 4 | The CRC of the EHT-SIG-A (26 bits of A1 and 16 bits up to B15 of A2, that is, 42 bits in total) field up to here. |
| | B20-B25 | Tail | 6 | An area to set "0" to indicate the end portion to a trellis convolution decoder. |

TABLE 3

| | Bit Position | Subfield | Bit Count | Description |
|---|---|---|---|---|
| EHT-SIG-A1 | B0 | UL/DL | 1 | This subfield indicates whether the PPDU is for UL or DL, and has the same value as TXVECTOR UPLINK FLAG. |
| | B1-B3 | SIGB MCS | 3 | This subfield indicates the MCS of the EHT-SIG-B field. "0" is set for MCS 0, "1" is set for MCS 1, "2" is set for MCS 2, "3" is set for MCS 3, "4" is set for MCS 4, or "5" is set for MCS 5. "6" and "7" are reserved areas. |
| | B4 | SIGB DCM | 1 | "1" is set if the HT-SIG-B field is modulated using DCM. |
| | B5-B10 | BSS Color | 6 | 6-bit number for identifying the BSS |
| | B11-B14 | Spatial Reuse | 4 | This subfield indicates whether Spatial Reuse is allowed during transmission of this PPDU. The value of Spatial Reuse field encoding shown in the separate table is set. |
| | B15-B17 | Bandwidth | 3 | "0" is set for 20 MHz "1" is set for 40 MHz; or "3" is set for 160 MHz (80 + 80 MHz). When the SIGB Compression field is "0", "4" is set if only the secondary 20 MHz is puncturing in 80 MHz preamble puncturing. "5" is set if two 20 MHz of the secondary 40 MHz are puncturing in 80 MHz preamble puncturing "6" is set if only the secondary 20 MHz is puncturing in 160 (or 80 + 80) MHz preamble puncturing, or "7" is set if only the secondary 40 MHz is puncturing in 160 (or 80 + 80) MHz is preamble puncturing If the SIGB field is "1" the value between "4" to "7" means "reserved" |
| | B18-B21 | Number of EHT-SIG-B Symbols or MU-MIMO Users | 4 | When the SIGB Compression field is "0", this subfield indicates the number of OFDMA symbols in the EHT-SIG-B. If the number of OFDM symbols in the EHT-SIG-B is smaller than 16, the number obtained by subtracting 1 from the number of OFDM symbols in the EHT-SIG-B is set. If at least one receiving terminal has set the capability of supporting the number of EHT SIG-B OFDM symbols larger than 16 to "0","15" is set to indicate that the number of OFDM symbols in the EHT-SIG-B is 16. If all the receiving terminals have set the capability of supporting the number of EHT-SIG-B OFDM symobls larger than 16 to "0" and the data rate of the EHT-SIG-B is smaller than MCS 4 which does not use DCM,"15" is set to indicate that the number of OFDM symbols in the EHT-SIG-B is equal to or larger than 16. When the SIGB Compresson field is "1", the value set here means the number obtained by subtracting 1 from the number of MU-MIMO users. |
| | B23-B24 | GI + LTF Size | 2 | This subfield indicates the Guard Interval period and the EHT-LTF size. "0" is set for 4 × EHT-LTF and 0.8 μs GI, "1" is set for 2 × EHT-LTF and 0.8 μs. GI, "2" is set for 2 × EHT-LTF and 1.6 μs GI, or "3" is for 4 × EHT-LTF and 3.2 μs GI. |

TABLE 3-continued

| Bit Position | Subfield | Bit Count | Description |
|---|---|---|---|
| B25 | Doppler | 1 | "1" is set if either of the following conditions is met: the number of OFDM symbols in the data field is larger than "the value indicated by the midamble period +1" and a midamble exists, and the number of OFDM symbols in the data field is equal to or smaller than "the value indicated by the midamble period + 1", no midamble exists, and the channel changes. rapidly. |

TABLE 4

| | Bit Position | Subfield | Bit Count | Description |
|---|---|---|---|---|
| EHT-SIG-A2 | B0-B6 | TXOP | 1 | Transmission Opportunity If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_Duration - 512)/8 is set in B1 to B6. |
| | B7 | Multi-AP | 1 | "1" is set if data transmission/reception is performed with a plurality of APs. "0" is set of data transmission/reception is performed with a single AP. |
| | B8-B10 | Number of EHT-LTF Symbols And Midamble Periodicity | 3 | This subfield indicates the number of EHT-LTFs. "0" is set for one EHT-LTF, "1" is set for two EHT-LTFs, "2" is set for four EHT-LTFs, "3" is set for six EHT-LTFs, or "4" is set for eight EHT-LTFs. When the Doppler field is "1", B8 and B9 indicate the number of EHT-LTF symbols, and B10 indicates the midamble period. |
| | B11 | LDPC Extra Symbol Segment | 1 | This subfield indicates the presence/absence of an extra OFDM symbol segment for LDPC |
| | B12 | STBC | 1 | When the number of users of each RU (Resource Unit) is not larger than 1, "1" is set to indicate that STBC is used for encoding. |
| | B13-B14 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| | B15 | PE Disambiguity | 1 | Disambiguity field of Packet Extension |
| | B16-B19 | CRC | 4 | The CRC of the EHT-SIG-A (26 bits of A1 and 16 bits up to B15 of A2, that is, 42 bits in total) field up to here. |
| | B20-B25 | Tail | 6 | An area to set "0" to indicate the end portion to a trellis convolution decoder. |

Note that the EHT-SIG-B 706 of the EHT MU PPDU includes the information of Common field as shown in Table 5 and the information of User Block field as shown in Table 6, which are necessary for reception of the PPDU.

TABLE 5

| Subfield | | Bit Count | Description |
|---|---|---|---|
| Common field | RU Allocation | N × 8 | This subfield indicates RU allocation used in the data portion of a frequency axis When N = 1, EHT MU PPDUs of |

TABLE 5-continued

| Subfield | Bit Count | Description |
|---|---|---|
| | | 20 MHz and 40 MHz are allocated. When N = 2, an EHT MU PPDU of 80 MHz is allocated. When N = 4, and EHT MU PPDU of 160 MHz or 80 + 80 MHz is allocated. |
| Center 26-tone RU | 1 | This subfield is used only when the Bandwidth field of EHT-SIG-A field of an EHT MU PPDU is larger than 1 (if the frequency is equal to or higher than 80 MHz). This subfield indicates whether to use a 26-tone RU at the center. |
| CRC | 4 | CRC calculation value |
| Tail | 4 | Trailer bit, which is set to 0. |

TABLE 6

| | Subfield | Bit Count | Description |
|---|---|---|---|
| User Block field | User field | N × 21 | This subfield indicates information for each user. |
| | CRC | 4 | CRC calculation value |
| | Tail | 6 | Trailer bit, which is set to 0. |

As shown in Table 6, in the User Block field, User field is included, and information for each user is stored. The format of User field changes depending on whether data is transmitted to a plurality of users by OFDMA or data is transmitted by MU-MIMO. Table 7 shows User field when data is transmitted by OFDMA, and Table 8 shows User field when data is transmitted by MU-MIMO.

TABLE 7

| | Bit Position | Subfield | Bit Count | Description |
|---|---|---|---|---|
| User field | B0-B10 | STA-ID | 11 | This subfield indicates the ID of an STA or an STA group that is the receiver of the RU of an HE MU PPDU |
| | B11-B13 | NSTS | 3 | This subfield indicates the number of Space-time streams. |
| | B14 | Tx Beamforming | 1 | When transmission Beamforming is used, "1" is set. When transmission Beamforming is not used, "0" is set. |
| | B15-B18 | MCS | 4 | This subfield indicates the value of Modulation and Coding Scheme |
| | B19 | DCM | 1 | This subfield indicates whether Dual Carrier Modulation is applied to the data field. |
| | B20 | Coding | 1 | When BCC (Binary Convolutional Code) is used, "0" is set. When LDPC (Low Density Parity Check) is used "1" is set. |

TABLE 8

| | Bit Position | Subfield | Bit Count | Description |
|---|---|---|---|---|
| User field | B0-B10 | STA-ID | 11 | This subfield indicates the ID of an STA or an STA group that is the receiver of the RU of an HE MU PPDU |
| | B11-B14 | Spatial Configuration | 4 | This subfield indicates the number of Spatial Streams of an STA in MU-MIMO Allocation |
| | B15-B18 | MCS | 4 | This subfield indicates the value of Modulation and Coding Scheme |
| | B19 | Reserved | 1 | Reserved area |
| | B20 | Coding | 1 | When BCC (Binary Convolutional Code) is used, "0" is set. When LDPC (Low Density Parity Check) is used, "1" is set. |

Note that the contents of these subfields are the same as the contents defined the IEEE802.11ax standard, and a description thereof will be omitted here.

As described above, in the frame structures of the PPDUs (the EHT SU PPDU, the EHT ER PPDU, and the EHT MU PPDU) used in the IEEE802.11EHT standard, it is possible to notify the STA whether a single or a plurality of APs transmit data. That is, the S-AP can notify the STA whether an AP that concurrently transmits data to the common partner device (STA) exists in addition to the self-device. In addition, by transmitting this frame, the M-AP can notify the S-AP whether another S-AP that concurrently transmits data to the common partner device (STA) exists (or whether the M-AP concurrently transmits data). At this time, for example, if the STA executes connection processing to only one AP, the STA can recognize, by a radio channel different from the AP for which the connection processing has been executed, that is, by a radio channel different from the radio channel on which the self-device is operating, that another AP that the STA should communicate with exists. Note that the radio channel here can include, for example, a frequency channel or a space channel. For example, upon confirming the PHY preamble and confirming that data from a plurality of APs are received, the STA can operate to specify the plurality of APs that are the data transmission sources. The STA can confirm, for example, a transmitter address in a MAC (Medium Access Control) header for each of the plurality of data streams, thereby obtaining the information of the plurality of APs. Also, for example, if the pieces of information of the plurality of APs are confirmed, the STA can individually transmit an acknowledgement (ACK/ NACK) to each AP. Also, if the radio quality of data from some APs has degraded, the STA can notify any one of the APs (for example, the M-AP) that the APs should be excluded from the target of Multi-AP Coordination. This makes it possible to maintain communication at high radio quality in the STA. Additionally, in the STA or AP, the user may be notified, via a UI, of information representing whether data are transmitted from a plurality of APs to the STA. Also, if the self-device does not support the Multi-AP Coordination, and a PPDU representing that data are transmitted from a plurality of APs is received, the STA can immediately discard the PPDU. According to this, in the STA, for a PPDU to which the self-device is not adaptable, information after the Multi-AP subfield is not unnecessarily decoded. Hence, power consumption can be suppressed. Note that the present invention can be implemented not only by the APs 102 to 104 and the STAs 105 to 107, which are communication devices, but also by an information processing device (for example, a radio chip) configured to generate the above-described PHY preamble.

Note that in the above-described example, the Multi-AP subfield is prepared as a 1-bit field to represent whether data are transmitted from a plurality of APs to the STA. However, the present invention is not limited to this. For example, the Multi-AP subfield may be prepared as a field of two or more bits to show the number of APs that transmit data to the STA. For example, if a 2-bit field is prepared, it can show by "00" that data is transmitted from one AP, by "01" that data are transmitted from two APs, by "10" that data are transmitted from three APs, and by "11" that data are transmitted from four or more APs. Similarly, when a field of three or more bits is prepared, it can represent a larger number of APs.

According to the present invention, it is possible to recognize whether a terminal of a wireless LAN is concurrently communicating with a plurality of access points.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device that operates as an access point (AP) and transmits a radio frame including a preamble and a data field of a physical layer (PHY):
wherein the preamble includes an L-STF (Legacy Short Training Field), an L-LTF (Legacy Long Training Field), an L-SIG (Legacy Signal Field), and a second Signal field, and
the second Signal field includes a subfield that consists of 2 bits and includes information indicating whether a coordinated transmission of data to a single partner device that operates as a station (STA) is performed by a plurality of access points; and
wherein the subfield indicates, by using said 2 bits, the information in accordance with a number of logical access points that transmit data.

2. The communication device according to claim 1, wherein the information in the subfield indicates whether devices that perform the coordinated transmission comprise a single or a plurality of devices.

3. The communication device according to claim 1, wherein the information in the subfield indicates a number of devices that perform the coordinated transmission.

4. The communication device according to claim 1, wherein the subfield includes the information according to a number of physical access points that transmit data.

5. The communication device according to claim 1, wherein the subfield includes the information in accordance with the number of logical access points that transmit data.

6. The communication device according to claim 1, wherein the plurality of the access points includes the communication device and another access point device.

7. The communication device according to claim 1, wherein the communication device operates as a master access point and the plurality of the access points include a plurality of slave access points and the radio frame is transmitted from the communication device to at least one of the plurality of the slave access points.

8. The communication device according to claim 7, wherein the coordinated transmission by the plurality of slave access points is triggered by a trigger frame transmitted by the communication device as the master access point to the plurality of slave access points.

9. The communication device according to claim 1, wherein the second signal field is laid out after at least the L-SIG in the preamble.

10. A communication device that operates as a station (STA) and receives, from an access point (AP), a radio frame including a preamble and a data field of a physical layer (PHY):
wherein the preamble includes an L-STF (Legacy Short Training Field), an L-LTF (Legacy Long Training Field), an L-SIG (Legacy Signal Field), and a second Signal field, and the second Signal field includes a subfield that consists of 2 bits and includes information indicating whether coordinated transmission of data to the communication device is performed by a plurality of access points, wherein the received radio frame contains the information that indicates that the coordinated transmission is performed in the subfield and data from the AP in the data field, and wherein the subfield indicates, by using said 2 bits, the information in accordance with a number of logical access points that transmit data.

11. The communication device according to claim 10, wherein the communication device is configured to notify a user of information indicating whether data are received from the plurality of access points, based on the information in the subfield.

12. The communication device according to claim 10, wherein the plurality of access points includes the AP and another AP.

13. The communication device according to claim 12, the AP and the other AP receive a trigger frame from a master AP to trigger the coordinated transmission.

14. An information processing device that generates a radio frame including a preamble of a physical layer (PHY), which is to be transmitted by an access point (AP):

wherein the preamble includes an L-STF (Legacy Short Training Field), an L-LTF (Legacy Long Training Field), an L-SIG (Legacy Signal Field), and a second Signal field, and the second Signal field includes a subfield that consists of 2 bits and includes information indicating whether a coordinated transmission of data to a single station (STA) is performed by a plurality of access points, and wherein the subfield indicates, by using said 2 bits, the information in accordance with a number of logical access points that transmit data.

15. A communication method executed by a communication device that operates as an access point (AP), comprising:

transmitting a radio frame including a preamble and a data field of a physical layer (PHY), wherein the preamble includes an L-STF (Legacy Short Training Field), an L-LTF (Legacy Long Training Field), an L-SIG (Legacy Signal Field), and a second Signal field, and the second Signal field includes a subfield that consists of 2 bits and includes information indicating whether a coordinated transmission of data to a single partner device that operates as a station (STA) is performed by a plurality of access points, and wherein the subfield indicates, by using said 2 bits, the information in accordance with a number of logical access points that transmit data.

16. A communication method executed by a communication device that operates as a station (STA), comprising:

receiving, from an access point (AP), a radio frame including a preamble and a data field of a physical layer (PHY), wherein the preamble includes an L-STF (Legacy Short Training Field), an L-LTF (Legacy Long Training Field), an L-SIG (Legacy Signal Field), and a second Signal field, and the second Signal field includes a subfield that consists of 2 bits and includes information indicating whether coordinated transmission of data to the communication device is performed by a plurality of access points, and wherein the received radio frame contains the information that indicates that the coordinated transmission is performed in the subfield and data from the AP in the data field, and wherein the subfield indicates, by using said 2 bits, the information in accordance with a number of logical access points that transmit data.

17. A control method executed by an information processing device, comprising:

generating a radio frame including a preamble of a physical layer (PHY), which is to be transmitted by an access point (AP), wherein the preamble includes an L-STF (Legacy Short Training Field), an L-LTF (Legacy Long Training Field), an L-SIG (Legacy Signal Field), and a second Signal field, and the second Signal field includes a subfield that consists of 2 bits and includes information indicating whether a coordinated transmission of data to a single station (STA) is performed by a plurality of access points, and wherein the subfield indicates, by using said 2 bits, the information in accordance with a number of logical access points that transmit data.

18. A non-transitory computer-readable storage medium that stores a program configured to cause a computer in a communication device that operates as an access point (AP) to transmit a radio frame including a preamble and a data field of a physical layer (PHY):

wherein the preamble includes an L-STF (Legacy Short Training Field), an L-LTF (Legacy Long Training Field), an L-SIG (Legacy Signal Field), and a second Signal field, and the second Signal field includes a subfield that consists of 2 bits and includes information indicating whether a coordinated transmission of data to a single partner device that operates as a station (STA) is performed by a plurality of access points, and wherein the subfield indicates, by using said 2 bits, the information in accordance with a number of logical access points that transmit data.

19. A non-transitory computer-readable storage medium that stores a program configured to cause a computer in a communication device that operates as a station (STA) to receive, from an access point (AP), a radio frame including a preamble and a data field of a physical layer (PHY):

wherein the preamble includes an L-STF (Legacy Short Training Field), an L-LTF (Legacy Long Training Field), an L-SIG (Legacy Signal Field), and a second Signal field, and the second Signal field includes a subfield that consists of 2 bits and includes information indicating whether coordinated transmission of data to the communication device is performed by a plurality of access points, wherein the received radio frame contains the information that indicates that the coordinated transmission is performed in the subfield and data from the AP in the data field, and wherein the subfield indicates, by using said 2 bits, the information in accordance with a number of logical access points that transmit data.

20. A non-transitory computer-readable storage medium that stores a program configured to cause a computer in an information processing device to generate a radio frame including a preamble of a physical layer (PHY), which is to be transmitted by an access point (AP):

wherein the preamble includes an L-STF (Legacy Short Training Field), an L-LTF (Legacy Long Training Field), an L-SIG (Legacy Signal Field), and a second Signal field, and the second Signal field includes a subfield that consists of 2 bits and includes information indicating whether a coordinated transmission of data to a single station STA is performed by a plurality of access points, and wherein the subfield indicates, by using said 2 bits, the information in accordance with a number of logical access points that transmit data.

\* \* \* \* \*